United States Patent [19]

Quillen

[11] Patent Number: 4,936,886
[45] Date of Patent: Jun. 26, 1990

[54] WHEEL MOUNTED STRING TRIMMER

[75] Inventor: Ralph D. Quillen, Monticello, Ga.

[73] Assignee: Snapper Power Equipment Division of Fuqua Indistries, Inc., McDonough, Ga.

[21] Appl. No.: 378,836

[22] Filed: Jul. 12, 1989

[51] Int. Cl.$^5$ .................... A01D 34/43; A01D 34/64
[52] U.S. Cl. ........................... 56/16.7; 56/12.7; 56/17.5; 172/14
[58] Field of Search ............ 56/12.7, 16.7, 17.4, 56/17.5, 17.6, 255, 256, 320.1; 172/13, 14, 17

[56] References Cited

U.S. PATENT DOCUMENTS

| 2,461,188 | 2/1949 | Stoner | 56/16.7 X |
| 2,708,335 | 5/1955 | Newton | 56/256 X |
| 2,913,058 | 11/1959 | Smith et al. | 172/14 X |
| 3,221,481 | 12/1965 | Mattson et al. | 56/256 X |
| 4,182,100 | 1/1980 | Letter | 172/17 X |
| 4,442,659 | 4/1984 | Enbusk | 56/256 X |
| 4,704,849 | 11/1987 | Gilbert | 56/17.5 |
| 4,802,327 | 2/1989 | Roberts | 56/17.4 X |
| 4,845,929 | 7/1989 | Kawasaki et al. | 56/12.7 X |

Primary Examiner—George A. Suchfield
Attorney, Agent, or Firm—William E. Mouzavires

[57] ABSTRACT

A wheel mounted string trimmer having a wheel support with a pair of wheels mounted on opposite sides thereof and handle bars extending rearwardly from the support. An elongated tube housing a drive shaft, is adjustably fastened to the wheel support to extend forwardly to a string trimmer head which is coupled to the drive shaft by a gear transmission whose housing is rotatably mounted on the front end of the tube. The trimmer head has a shield fixed to the transmission housing to be adjustable therewith about the tube housing. A yoke bracket is fixed to the shield while being mounted about the tube housing to be adjustable about the axis of the latter to orient the shield and head in the desired position for trimming. A gasoline engine, mounted to the rear of the tube housing, drives the head through the drive shaft and transmission.

34 Claims, 4 Drawing Sheets

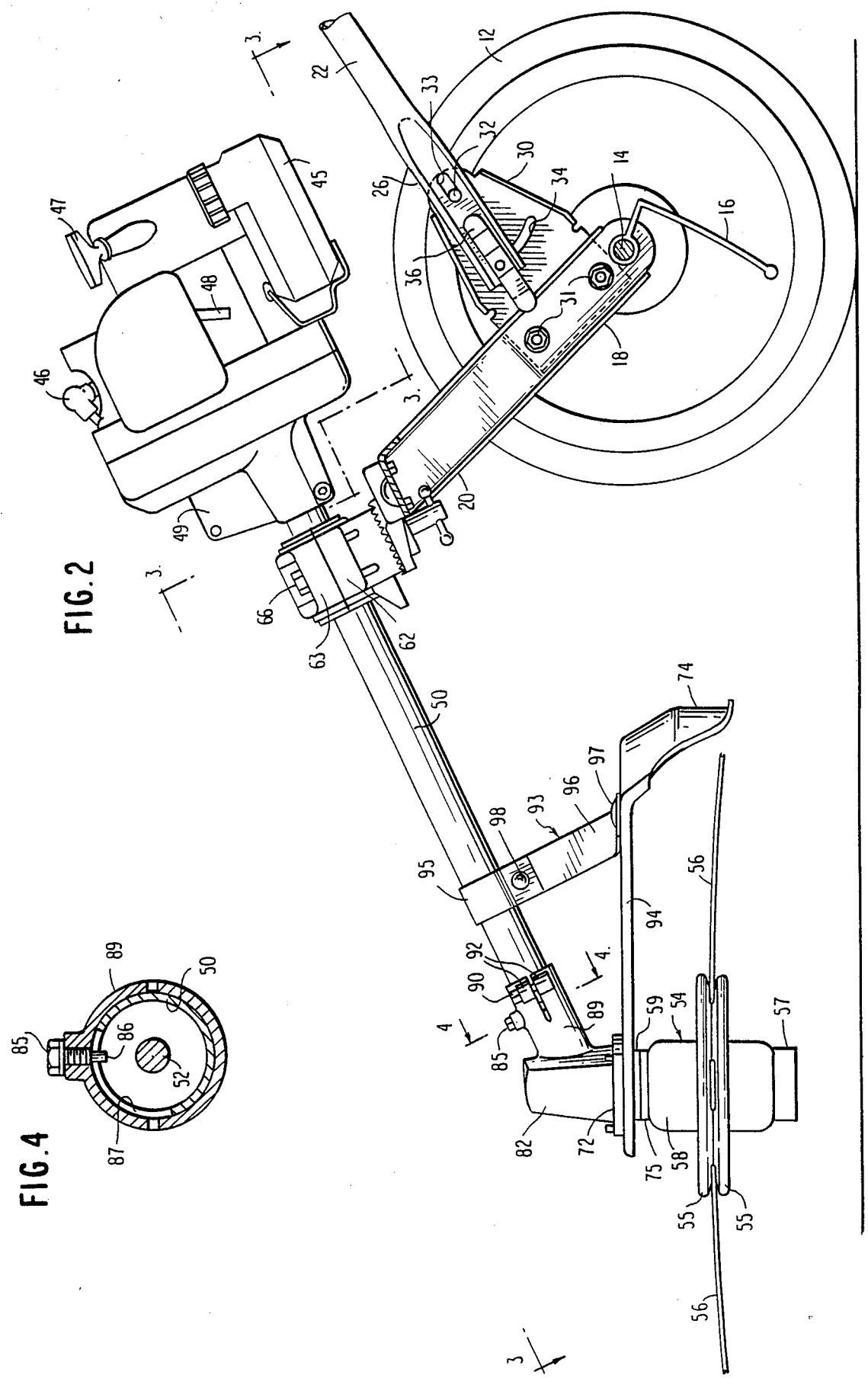

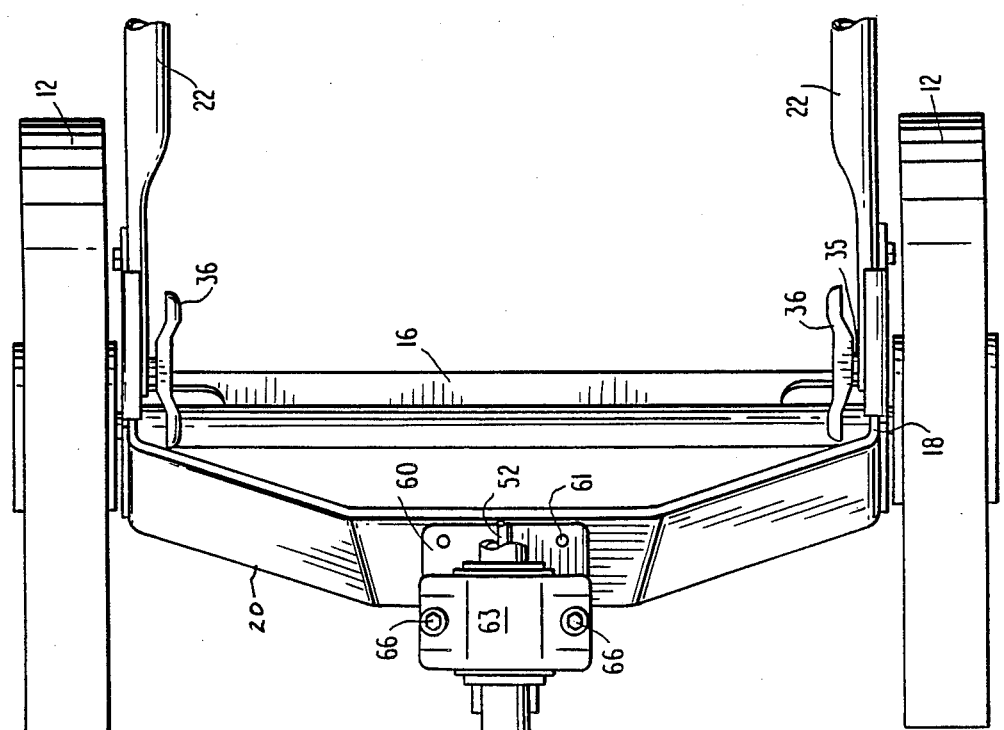
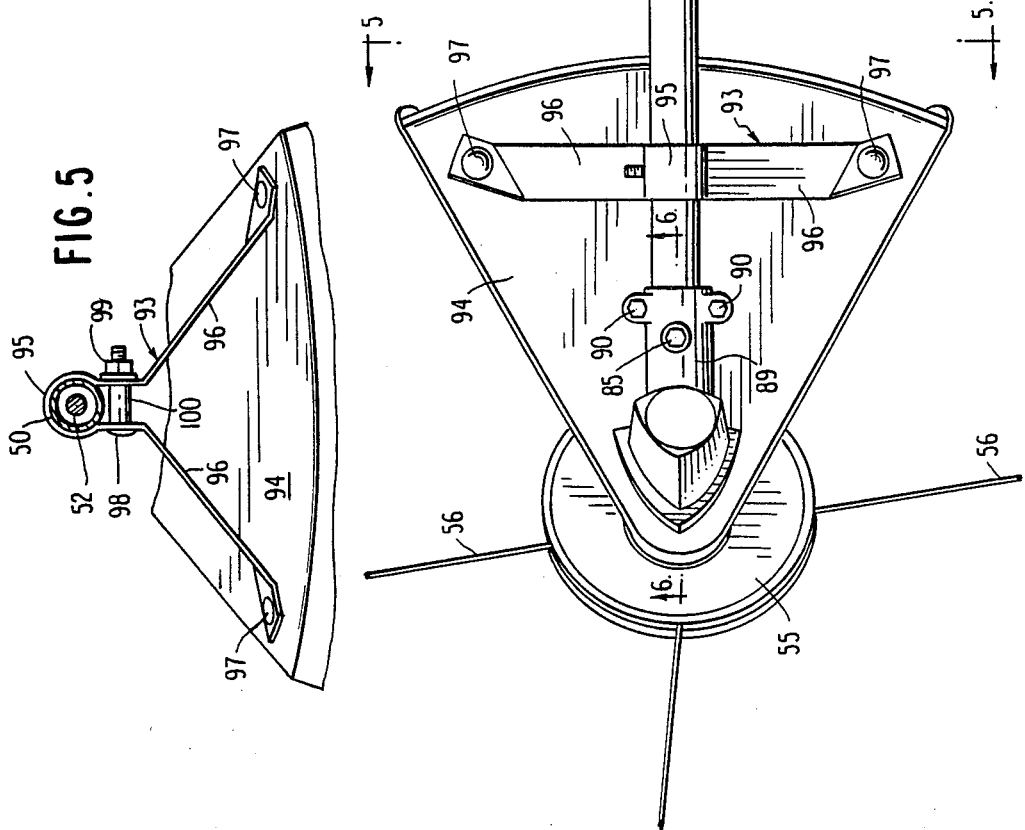
FIG.5
FIG.3

WHEEL MOUNTED STRING TRIMMER

BACKGROUND OF INVENTION

String trimmers are, of course, well-known in the art of lawn and garden power equipment. While originally these trimmers were commonly held by strap over the shoulders of the operator, the art has progressed to the point where there now exists in the art, wheel mounted trimmers which have eliminated the burden of carrying the trimmers while in operation. Examples of wheel mounted string trimmers are shown in U.S. Pat. Nos. 4,033,098—Green, 4,170,099—Owens, 4,137,694—Hooper, 4,703,613—Raymond, 4,704,849—Gilbert, and 4,642,976—Owens. In addition U.S. Pat. No. 4,442,659—Enbusk discloses a trimmer mounted on a wheeled dolly but which still requires the trimmer to be supported in part by hand.

OBJECTS OF THE PRESENT INVENTION

The present invention generally relates to wheel mounted string trimmers of the type described above or blade cutters and has for one of its objects, the provision of a novel and improved wheel mounted string trimmer or blade.

A further object of the present invention is to provide a novel and improved wheel mounted string trimmer or blade cutter that may be adjusted prior to operation to place the cutting element in a predetermined position suitable for a particular cutting operation. Included herein is such a wheel mounted string trimmer or blade cutter whose cutting head may be adjusted to extend at an angle to the direction of movement of its wheels. Further included herein is such a device whose cutting head may be adjusted to operate in a horizontal plane or at an angle to the horizontal plane as may be desired in an edging operation for example.

Another object of the present invention is to provide such a wheel mounted string trimmer or blade cutter that is well balanced, light in weight and easy and safe to operate.

SUMMARY OF INVENTION

In summary, a preferred embodiment of the trimmer of the present invention includes a wheel support having travel wheels mounted on opposite sides thereof with a handle extending rearwardly from the wheel support. An elongated drive shaft is mounted in an elongated tubular housing mounted on the wheel support to extend forwardly from the latter, with the housing being adjustable towards either side of the trimmer for a particular trimming operation. Once adjusted in the desired position, the housing is locked in place. A coupling, preferably a gear transmission mounted for adjustable rotation at the front of the housing, connects the drive shaft to a trimmer head having one or more cutting lines for trimming grass, weeds or other vegetation during rotation of the head. A shield is fixed to the coupling to be rotatively adjustable with the coupling about the axis of the drive shaft housing. The coupling, head and shield are secured in the desired adjusted position by a bracket which is fixed to the shield and releasably fastened to the drive shaft housing. A suitable power source is mounted to the rear of the drive shaft housing to drive the drive shaft in rotation. In another mode of the device, a rotatable cutting blade is substituted for the string cutters.

DRAWINGS

Other objects and advantages of the present invention will become apparent from the following detailed description taken in conjunction with the attached drawings in which:

FIG. 2 is an enlarged side elevational view of the string trimmer as seen generally along lines 2—2 of FIG. 1 and with the trimmer head adjusted approximately ninety degrees from the position shown in FIG. 1 and with a portion of the handle bars broken away;

FIG. 3 is a plan view taken generally along lines 3—3 of FIG. 2;

FIG. 4 is a cross-sectional view taken generally along lines 4—4 of FIG. 2;

FIG. 5 is a cross-sectional view taken generally along lines 5—5 of FIG. 3;

DETAILED DESCRIPTION

Figure 1:
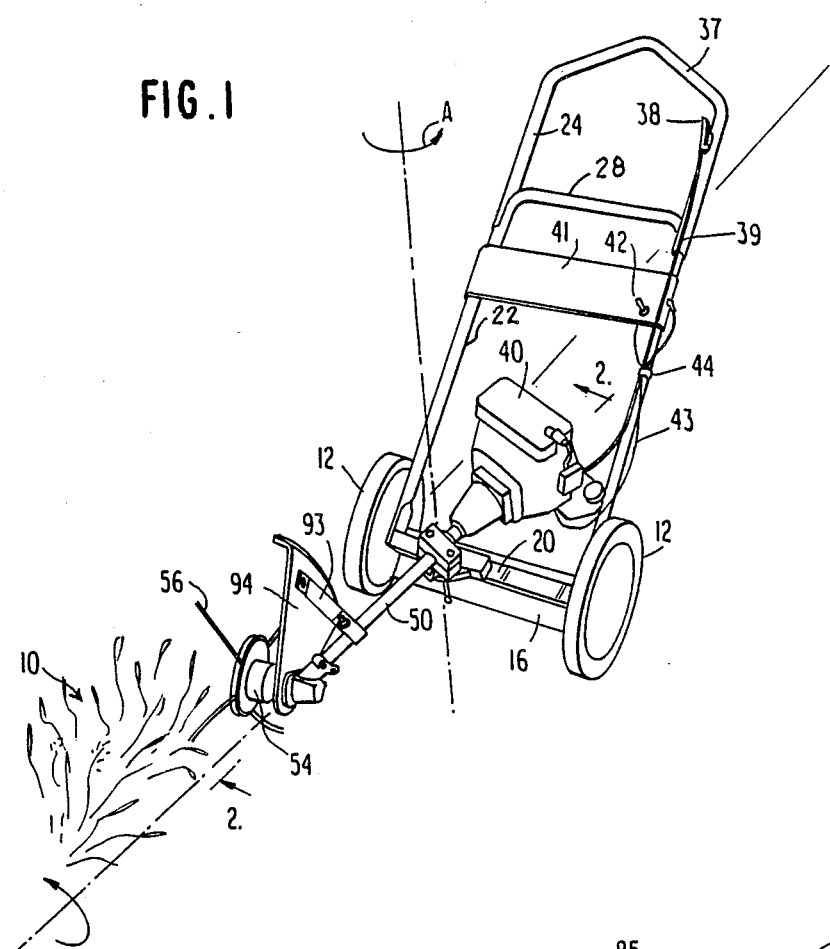
FIG. 1 is a perspective view of a wheel mounted string trimmer constituting a preferred embodiment of the present invention and as seen during a trimming operation.

Referring to the drawings in detail, there is shown for illustrative purposes only in FIG. 1 a wheel mounted string trimmer machine constituting a preferred embodiment of the present invention used for cutting weeds, grass or other vegetation shown as 10. The machine includes a pair of wheels 12 conventionally mounted on the opposite ends of a horizontal axle 14 (shown in FIG. 2) having a depending guard 16 mounted thereon and extending between the wheels as shown in FIGS. 1, 2 and 3. Mounted on the axle 14 to extend upwardly and forwardly thereof is an engine mount in the form of a yoke support including opposite legs 18 mounted about the axle and a crosspiece 20 extending between the legs 18.

Mounted to extend rearwardly and upwardly from the yoke is a handle bar assembly including a lower handle generally designated 22 and an upper handle generally designated 24 in FIG. 1. The lower handle 22 includes opposite legs 26 joined at their upper ends by a crosspiece 28 and mounted at their lower ends by brackets 30 respectively fixed to the legs 18 of the yoke as shown in FIG. 2. Brackets 30 are fixed to the legs 18 of the yoke by nut and bolt fasteners 31. The legs 26 of the lower handle 22 are mounted for rotational adjusting movement about a pivot pin 32 fixed to the brackets 30 respectively and extending through slots 33 in the legs 26 as shown in FIG. 2. Once the desired angular orientation of the handle 22 is achieved relative to the brackets 30, the handle is locked in position by threaded bolts 35 (FIG. 3) extending through threaded apertures in the legs 26 and slots 34 (FIG. 2) in the brackets 30. Bolts 35 have shoulders (not shown) which press the handle legs 26 against the brackets 30 to lock the legs in position upon rotation of the bolts achieved by handles 36 shown in FIGS. 2 and 3.

Figure 6:
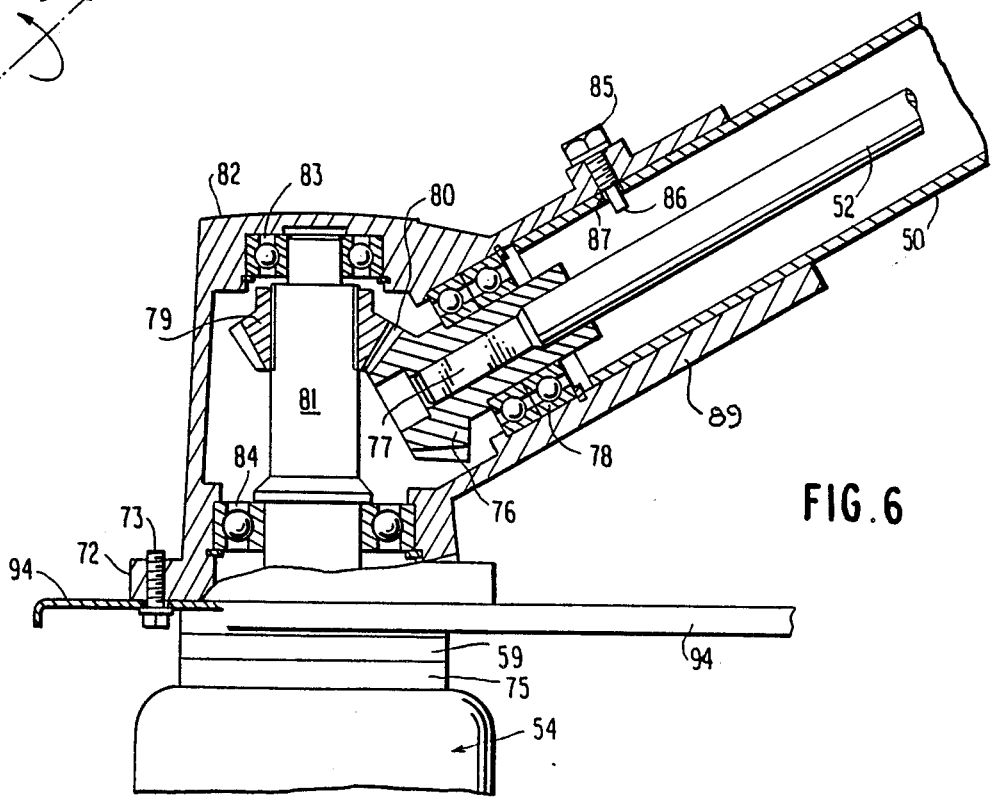
FIG. 6 is an enlarged cross-sectional view taken generally along lines 6—6 of FIG. 3.

The upper handle 24 includes opposite arms joined at their upper ends by a crosspiece 37 and fixed at their lower ends to the legs 22 of the lower handle 22 as shown in FIG. 1. Mounted on the left side of the upper handle 24 is a throttle control handle 38 connected by cable 39 to a gasoline powered engine generally designated 40 in FIG. 1. Mounted to and across the legs of the lower handle 22 is a panel 41 having mounted thereto an ignition switch 42 connected to the engine 40 by a wire 43. A clip 44 secures the cable 39 and wire 43 to the left leg of the lower handle 22 as shown in FIG. 1. The engine 40 is conventional and includes, as shown in FIG. 2, a gasoline tank 45, a spark plug and cap 46, a starter pull-cord 47 and a choke control lever 48 supported by a frame 49. The latter is fixedly mounted about the rear end of an elongated tubular housing 50 through which extends an elongated drive shaft 52 extending from the output of the engine 40 to a gear assembly as shown in FIG. 6 for driving a trimmer head generally designated 54 as will be described below. Although any suitable or conventional trimmer head may be employed, the preferred embodiment shown employs a fixed line head similar to that described in U.S. Pat. No. 4,756,146, owned by the assignee of the subject application. The disclosure of said U.S. Pat. No. 4,756,146 is hereby incorporated by reference herein and made a part hereof.

The trimmer head 54 shown (FIG. 2) includes a pair of overlying circular plates 55 having passages formed therein for receiving in fixed position, a cutting line 56. Fixed to the plates 55 and depending therefrom is a wear pad 57. Fixed to and extending above the plates 55 is a cylindrical shaft housing 58 which receives the lower end of a drive shaft 81 to which it is fixed to be driven thereby together with the plates 55 and pad 57.

Figure 7:
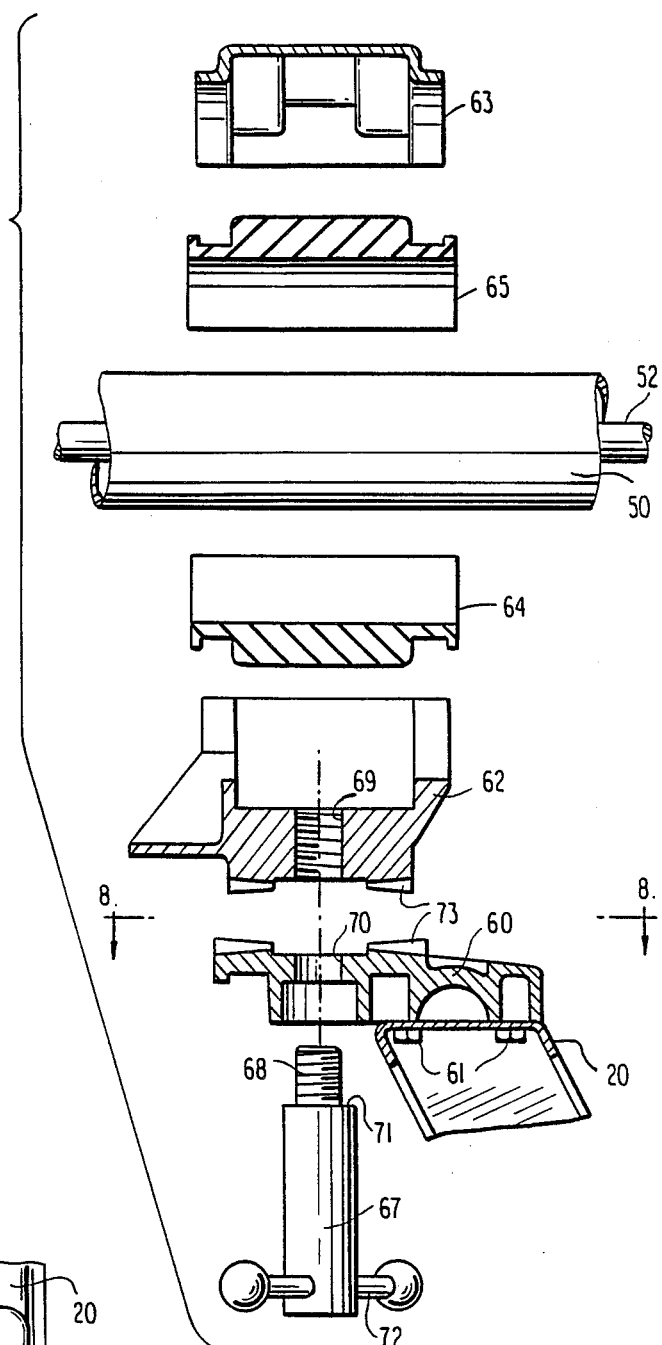
FIG. 7 is an exploded elevational view of a clamp bracket used to mount the trimmer to a wheel mounted yoke.

Referring now to FIGS. 2, 3, 7 and 8, the drive shaft housing 50 is mounted to the central portion of yoke 20 to extend either forwardly equidistant from the path of the wheels 12 as shown in FIG. 3 or in any position towards the path of either of the wheels 12, i.e., towards either side of the machine, one such position being shown in FIG. 1 where the housing 50 extends towards the right side of the machine. This mounting in the preferred embodiment is effected by a clamp assembly including, as shown in FIG. 7, a base plate 60 fixed by bolts 61 to the yoke 20 and projecting forwardly beyond the yoke 20; and a pair of locking or clamp members 62 and 63 having semicylindrical passages received about the housing 50. In the preferred embodiment, a pair of split rubber shock mounts 64 and 65 having a generally cylindrical shape are received in the clamp members 62 and 63 respectively and engage about the surface of the housing 50. The clamp members 62 and 63 are clamped together about the housing to fix the housing therein by bolts 66 extending through opposite sides of the clamp members as shown in FIGS. 2 and 3.

Figure 8:
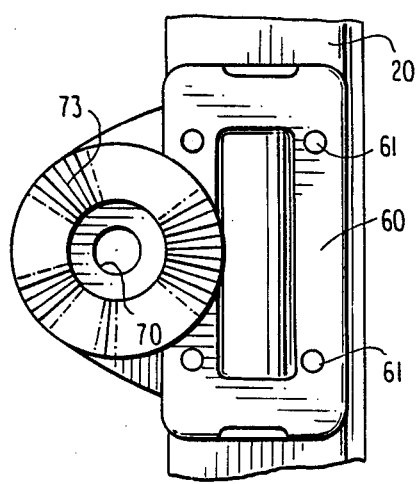
FIG. 8 is a plan view of one part of the bracket clamp taken generally along lines 8—8 of FIG. 7.

Clamp members 62 and 63 are fixed to the base plate 60 and, in turn, the yoke 20, by means of a bolt 67 having a reduced diameter threaded portion 68 engaged in a threaded bore 69 formed vertically through the lower wall of clamp member 62 as shown in FIG. 7. Threaded bolt portion 68 passes through an aperture 70 formed in the base plate 60 with the shoulder 71 of bolt 67 engageable against the lower surface of base plate 60 surrounding the aperture 70. It will be seen that advancement of bolt 67 into the lower clamp member 62 to tightly engage the bolt shoulder 71 against the base plate 60 will serve to secure the clamp members 62 and 63 with the housing 50 therebetween to the yoke 20. Retraction of bolt 67 from the threaded bore 69 of lower clamp member 62 will, of course, loosen the clamp members 62, 63 relative to the yoke to permit the position of the housing 50 to be adjusted to either side or to the centerline position of the machine as indicated by the arrow A in FIG. 1. To increase the locking engagement between the clamp members 62, 63 and the base plate 60 in the preferred embodiment, a plurality of radiating interlocking teeth and grooves 73 are provided in the mating surfaces of the clamp member 62 and base plate 60 as shown in FIGS. 7 and 8. In one preferred embodiment not shown, a slidable bolt replaces the threaded bolt 67, 68 and is actuated by an overcenter quick release mechanism having a hand lever which may be easily manipulated by hand to slide the bolt for locking or releasing the clamp assembly.

Referring to FIG. 6, the drive shaft 52 is connected to drive the trimmer head 54 through means including a gear assembly including a bevel gear 76 which has a central square cross section passage receiving a square cross section end portion 77 of drive shaft 52. Bevel gear 76 is received in a bearing assembly 78 suitably mounted within housing 89. The gear assembly further includes a second bevel gear 79 splined to a drive shaft 81 to drive the same with the bevel gears 76 and 79 being in mesh at 80. Drive shaft 81 is mounted for rotation in a gear housing 82 having an inverted generally cup-like configuration by means of bearing assemblies 83 and 84. In the specific embodiment shown, gear housing 82 has a cylindrical mounting sleeve 89 fixed to and projecting as an integral part from it rearwardly at an angle. Sleeve 89 is mounted for rotation on the forward end of housing 50 to enable the orientation of the trimmer head to be adjusted over a range of about ninety degrees (90°) as will be described further. Gear housing 82, 89 is held on housing 50 by screws 90 which are received in flanges 92 formed on bifurcated portions on opposite sides of sleeve 89 as best shown in FIGS. 2 and 3. In addition, a stop shown as a screw 85 is radially mounted in threads in the wall of sleeve 89 with the lower end 86 of the screw projecting through a slot 87 formed circumferentially in the wall of housing 50 as shown in FIG. 4. The opposite ends of slot 87 define the opposite extreme positions of the sleeve 89 and the trimmer head 54, and in the preferred embodiment, the slot 87 extends for a distance greater than ninety degrees. Screw 85 also functions to prevent relative longitudinal movement and separation between the tube housing 50 and the gear housing 82, 89.

Once the gear housing 82 is adjusted in the desired position by rotation about housing 50, the gear housing 82 is fixed in position by a shield support or bracket 93 which supports a shield 94. The latter is fixed to the underside of the gear housing 82 at flanges 72 by screws 73, see FIG. 6. Shield 94 has a generally triangular shape in the specific embodiment shown, and extends rearwardly from the gear housing 82 and terminates in an arcuate flange 74 so as to deflect cut trimmings to the ground. At its forward end, shield 94 has an aperture received about the drive shaft 81, and a collar 59 and blade holder 75 are interposed between the shield 94 and head 54 as shown in FIGS. 2 and 6. The blade holder 75 is used to mount a steel edger blade (not shown) which may be used for edging or cutting instead of the string trimmer head. In the latter mode, the trimmer head 54 is removed and the blade is mounted to the holder 75 which rotates with the drive shaft 81.

Referring to FIGS. 3 and 5, the shield support 93 in the specific embodiment shown, is a yoke structure including a central generally semicircular mounting portion 95 received about the housing 50 and a pair of opposite legs 96 depending downwardly from central mounting portion 95 and fixed at 97 to the shield 94. In order to secure the shield 94 in the adjusted position relative to the housing 50, a bolt 98 is received through aligned apertures provided in the opposite sides of the legs 96 just below the central mounting portion 95 and a nut 99 is fastened on the bolt 98 as shown in FIG. 5. A spacer sleeve 100 is provided about bolt 98 between the opposite portions of the legs 96. In order to adjust the gear housing 82, 89 and trimmer head 54 into a desired orientation for trimming, the screws 90 in the gear housing sleeve 89 are slightly loosened to permit rotation of the gear housing 82, 89, trimmer head 54 and shield 94. Once these elements are adjusted, the screws 90 are tightened to secure the gear housing 82, 89 on the tube housing 50 in the adjusted position. In one preferred embodiment, one or both of screws 90 may not shown, be formed by T-bolts having a T extension to facilitate loosening and tightening of the same by hand.

It will thus be seen that the trimmer head and its cutting lines 56 may be adjusted to operate in a generally horizontal plane as shown in FIG. 2, a generally vertical plane as shown in FIG. 1, or in a number of different planes extending at an angle to the horizontal. Moreover, when trimming close to a vertical fence or wall, the entire housing shaft 50 may be adjusted to either side of the machine as illustrated in FIG. 1 by loosening the clamp members 62, 63 through means of handle 72 and then rotating the clamp members 62, 63 with the housing 50 about a generally vertical axis relative to the base plate 60 and then tightening the clamp members by advancing bolt 67 by means of the handle 72. In addition, the level of the handle bars 22, 24 may be adjusted to suit the operator or a particular trimming operation.

Although a preferred embodiment of the invention has been shown and described above, it will be apparent to those skilled in the art that modifications to the preferred embodiment may be made without departing from the scope of the invention which is defined in the claims to follow.

What is claimed is:

1. A wheel mounted string trimmer comprising in combination a wheel support having at least one travel wheel mounted on said wheel support for rotation over a ground surface, an elongated tubular drive shaft housing extending forwardly of said wheel support and having opposite front and rear end portions, means fixing said drive shaft housing to said wheel support to be movable with said wheel support as a unit, a string trimmer head located at the front end portion of said drive shaft housing, a power source located at the rear end portion of said drive shaft housing, drive means operatively connected to and between said power source and said trimmer head to drive the trimmer head, said drive means including a drive shaft in said drive shaft housing and a transmission having a housing mounted for adjustable rotational movement about the front end portion of said drive shaft housing, a shield mounted to the drive transmission housing to be rotatable with the transmission housing and trimmer head relative to and about said drive shaft housing, and means connected to the shield for releasably securing the shield head and transmission housing in adjusted position relative to said drive shaft housing.

2. The string trimmer defined in claim 1 wherein said means fixing the drive shaft housing to said wheel support includes a yoke having opposite ends mounted to the wheel support and a centrally located mounting portion, and fastening means on said drive shaft housing and said mounting portion of said yoke for releasably fixing the drive shaft housing to the yoke.

3. The string trimmer defined in claim 2 wherein said fastening means includes a pair of locking members respectively fixed to said drive shaft housing and said yoke and means for releasably engaging said locking members.

4. The string trimmer defined in claim 3 including means for loosening said locking members relative to said yoke for adjusting the drive shaft housing towards either side at an angle to a forward-rearward direction of said string trimmer.

5. The string trimmer defined in claim 4 wherein said means connected to the shield includes opposite legs fixed to the shield on opposite sides of the drive shaft housing, a central portion received about the drive shaft housing and means releasably fixing said central portion to said drive shaft housing.

6. The string trimmer defined in claim 5 wherein said means releasably securing said central portion to said drive shaft housing includes a bolt received below said drive shaft housing and in said opposite legs.

7. The string trimmer defined in claim 6 further including a pair of handle bars mounted on opposite sides of said wheel support and extending upwardly and rearwardly from said opposite sides of the wheel support and wherein said drive shaft housing is located between said handle bars and wherein said wheel support includes an axle and there is further included a pair of travel wheels mounted on opposite sides of said axle, and a guard depending from the axle and extending between said wheels.

8. The string trimmer defined in claim 1 wherein said means connected to the shield includes opposite legs fixed to the shield on opposite sides of the drive shaft housing, a central portion received about the drive shaft housing and means releasably securing said central portion to said drive shaft housing.

9. The string trimmer defined in claim 1 including means for adjusting the drive shaft housing towards either side at an angle to a forward-rearward direction of the string trimmer.

10. The string trimmer defined in claim 1 wherein said means fixing the drive shaft housing to said wheel support includes a yoke having opposite ends mounted to the wheel support and a centrally located mounting portion, and fastening means on said drive shaft housing and said mounting portion of said yoke for releasably fixing the drive shaft housing to the yoke.

11. The string trimmer defined in claim 1 including stop means including a stop fixed on one of said transmission housing and drive shaft housing for preventing longitudinal separation of said transmission housing and drive shaft housing.

12. The string trimmer defined in claim 11 wherein said stop means includes an arcuate slot in the other of said transmission housing and drive shaft housing and receiving said stop for limiting the rotative adjustment of said transmission housing relative to the drive shaft housing.

13. A wheel mounted cutter comprising in combination a wheel support including at least one wheel mounted on said wheel support for rotation over a ground surface, a drive shaft housing extending forwardly of said wheel support and having a front end portion, means mounting said drive shaft housing to said wheel support to be movable with said wheel support as a unit, a transmission housing including a transmission located at the front end portion of said drive shaft housing for driving a cutter connected to the transmission, drive means operatively connected to said transmission to drive the same, said drive means including a drive shaft in said drive shaft housing and means mounting the transmission housing for adjustable rotational movement relative to and about the front end portion of said drive shaft housing, and means for releasably securing the transmission housing in angularly adjusted position relative to said drive shaft housing.

14. The cutter defined in claim 13 wherein said means mounting the drive shaft housing to said wheel support includes a fastening means on said drive shaft housing and said wheel support for releasably fixing the drive shaft housing to the wheel support.

15. The cutter defined in claim 14 wherein said fastening means includes a pair of locking members respectively fixed to said drive shaft housing and said wheel support and means for releasably engaging said locking members with said drive shaft housing, and means for adjusting the drive shaft housing towards either side at an angle to a forward-rearward direction of said string trimmer.

16. The cutter defined in claim 13 wherein said means securing the transmission housing to the drive shaft housing includes a shield connected to the transmission housing and means securing the shield to the drive shaft housing.

17. The cutter defined in claim 16 wherein said means securing the transmission housing to the drive shaft housing includes a pair of legs fixed to the shield on opposite sides of the drive shaft housing, a central portion received about the drive shaft housing and means releasably securing said central portion to said drive shaft housing.

18. The cutter defined in claim 16 including means for preventing longitudinal separation of said transmission housing and drive shaft housing.

19. The cutter defined in claim 18 wherein said means for preventing longitudinal separation of said transmission and drive shaft housings includes a stop in one of said housings and an arcuate slot in the other of said housings.

20. The cutter defined in claim 13 including means for preventing longitudinal separation of said transmission housing and drive shaft housing.

21. The cutter defined in claim 20 wherein said means for preventing longitudinal separation of said transmission and drive shaft housings includes a stop in one of said housings and an arcuate slot in the other of said housings.

22. The cutter defined in claim 13 including means for adjusting the drive shaft housing towards either side at an angle to a forward-rearward direction of a path of movement of said wheel.

23. A wheel mounted cutter comprising in combination a wheel support including a yoke having opposite sides and a central portion, an axle mounted in opposite sides of the yoke below the central portion, a pair of travel wheels mounted on opposite ends of said axle, a cutter assembly including a drive shaft and a cutter member mounted at one end of the drive shaft forwardly of the yoke, and means mounting the shaft for adjustable movement to either side of said yoke about a generally vertical axis, said means including a pair of locking members respectively fixed relative to the shaft and means releasably securing said locking members relative to said central portion of said yoke.

24. The cutter defined in claim 23 including means for adjusting the cutter member relative to said shaft about a longitudinal axis of said shaft.

25. The cutter defined in claim 24 including a shield mounted in a plane above the cutter member, and means releasably securing the shield relative to the shaft.

26. The cutter defined in claim 23 including a pair of handle bars extending rearwardly from the opposite sides of said yoke and means for adjusting the level of said handle bars.

27. A wheel mounted cuter comprising in combination a wheel support including at least one wheel mounted on said wheel support for rotation over a ground surface, a drive shaft housing extending forwardly of said wheel support and having a front end portion, means mounting said drive shaft housing to said wheel support to be movable with said wheel support as a unit, a cutter housing located at the front end portion of said drive shaft housing for mounting a cutter to the drive shaft housing drive means for operating the cutter including a drive shaft in said drive shaft housing, means mounting the cutter housing for adjustable rotational movement relative to and about the front end portion of said drive shaft housing, and means for releasably securing the cutter housing in angularly adjusted position relative to said drive shaft housing.

28. A wheel mounted cutter comprising in combination a wheel support including a yoke have opposite sides and a central portion, a pair of travel wheels mounted on said support at said sides thereof, a cutter assembly including a drive shaft and a cutter member mounted at one end of the drive shaft forwardly of the yoke, and means mounting the drive shaft to said central portion for adjustable movement to either side of said yoke about a generally vertical axis, said means including a drive shaft housing receiving the drive shaft, and means releasably securing said housing relative to said central portion of said yoke.

29. The wheel mounted cutter defined in claim 28 further including a cutter member housing associated with the cutter member and being mounted for rotation about one end of said drive shaft housing for placing the cutter member into various angularly spaced cutting planes, and means for releasably fixing said housings against movement relative to each other once the cutter member is placed into a desired cutting plane.

30. The cutter member defined in claim 28 including a power means located rearwardly of the wheel support and operatively connected to the drive shaft for operating the same, said cutter member and said power means being supported on the wheels solely through the mounting of the drive shaft housing to said wheel support.

31. The cutter defined in claim 30 including a handle for pushing the cutter over the ground surface, said handle being mounted to said wheel support and extending rearwardly therefrom.

32. The cutter defined in claim 28 wherein said means mounting the shaft includes a pair of locking members engageable about said drive shaft housing.

33. The cutter defined in claim 31 wherein said means mounting said drive shaft further includes means releasably securing the locking members to said central portion of said yoke support.

34. The cutter defined in claim 32 wherein said said means releasably securing said locking members includes a fastener mounted on said central portion and engageable with one of said locking members.

* * * * *